Patented July 18, 1944

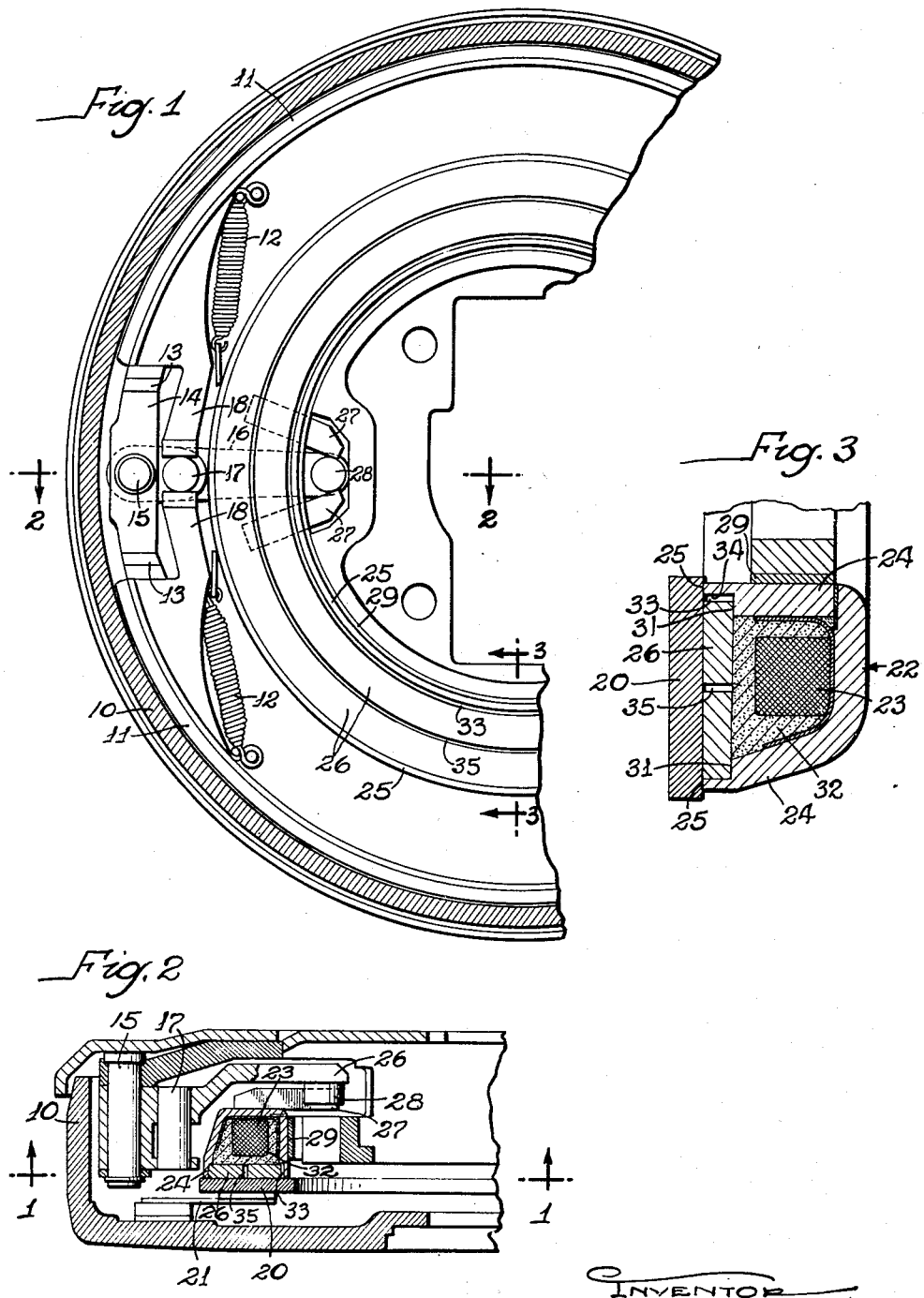

2,353,750

UNITED STATES PATENT OFFICE 2,353,750

ELECTROMAGNETIC FRICTION DEVICE

John George Oetzel, Beloit, Wis., assignor to Warner Electric Brake Manufacturing Company, South Beloit, Ill., a corporation of Illinois Application June 7, 1943, Serial No. 489,918

7 Claims. (Cl. 188—161)

This invention relates to improvements in electromagnetic friction devices, particularly those comprising an annular magnet having concentric poles with faces terminating at an axial friction surface adapted for gripping engagement with a flat armature.

One object is to provide a novel construction of the element of a device of the above character so as to minimize the possibility of warping of the coacting faces under frictional heat whereby to maintain high magnetic efficiency under the varying temperature conditions encountered in service use.

Another object is to minimize such warping in a magnetic friction device in which the major frictional wear is sustained by friction material of non-magnetic character.

Other objects and advantages of the invention will become apparent from the following detailed description taken in connection with the accompanying drawing, in which Figure 1 is a fragmentary sectional view of an electrically controlled brake having a friction device embodying the features of the present invention, the section being taken along the line 1—1 of Fig. 2.

Fig. 2 is a fragmentary sectional view taken along the line 2—2 of Fig. 1.

Fig. 3 is a cross-sectional view of the magnet taken along the line 3—3 of Fig. 2 on a somewhat larger scale.

While the invention is susceptible of various modifications and alternative constructions. I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The invention is shown in the drawing for purposes of illustration embodied in a brake comprising generally a rotatable drum 10 and friction shoes 11 extending around the inner drum surface for expansion into gripping engagement therewith. The shoe ends are disposed adjacent each other and normally drawn by springs 12 against stops 13 rigid with a non-rotatable anchor member 14. Mounted on a pivot 15 between the stops is a lever 16 carrying a stud 17 disposed between the ends of brackets 18 on the shoes and operable upon swinging of the lever in either direction away from the normal brake-released position shown to move one shoe end or the other away from its stop and thereby expand the shoes to apply the brake.

The magnetic friction device in which the present invention is embodied is incorporated in an actuator for the brake above described. It includes an armature ring 20 having a flat inwardly facing friction surface and supported concentric with the drum axis for a limited degree of floating axial movement. The mounting is provided with a plurality of flexible metal strips 21 arranged as secants of the armature ring with their opposite ends secured to the inturned drum flange and the armature ring respectively.

The magnet comprises a rigid ring 22 of magnetic material and of U-shaped cross section having an annular winding 23 disposed between two poles 24 whose radially spaced faces 25 are in a common plane and of substantially equal areas. A flat ring 26 of friction material is supported between the poles with its friction face substantially flush with the pole faces.

The magnet ring is journaled on a bearing 29 to turn through a limited degree about the drum axis. It is connected to the free end of the lever 16 by lugs 27 rigid with the back of the magnet and lying on opposite sides of a pin 28 on the lever.

Setting of the brake as above described takes place whenever the winding 23 is energized with the drum rotating. This produces a magnetic flux of high intensity in the closed magnetic circuit around the winding and the resulting gripping engagement between the friction faces of the magnet and armature is proportional to the strength of the energizing current. The magnet ring is thus driven frictionally by the armature ring, thereby moving with the wheel through a short angular distance. In this movement, one of the lugs 27 swings the lever 16 in the direction of drum rotation moving one shoe end 18 away from its anchor to expand the band against the drum. After the normal clearance has been taken up, slippage occurs between the faces of the magnet and armature rings and the brake remains applied so long as the magnet is energized. When the current flow is interrupted, the springs 12 contract the shoes and restore these and the magnet ring to the normal brake-released position shown.

The ring 26 above described preferably is composed of ordinary non-metallic friction material such as that used for the linings of automotive vehicle brakes. It is mounted on the poles 24 so as to sustain the major burden of the gripping engagement between the magnet and armature whereby to minimize wearing off of the pole faces 25 in service use. To this end, the ring is preferably constructed of a plurality of segments arranged end to end to form the ring 26 and supported along their inner and outer edges by shoulders 31 and intermediate their edges by a relatively rigid body 32 filling the space within the magnet ring and around the coil 23 and bonded to the friction ring. This filling may comprise granular material such as sand bonded with a thermosetting synthetic resin binder. Setting of the resin may be effected thermally after the ring has been filled to the proper level and the segments 26 pressed into position against the shoulders 31. The filling is thus solidified and the segments are bonded to the body 32 so as to be held in place securely.

In accordance with the present invention, warping of the friction face of the magnet under the heat created frictionally at the magnet face during gripping engagement of the magnet and armature is avoided by providing for freedom of radial expansion and contraction of the poles. For this purpose, the segments 26 in the final assembly are slightly narrower than the spacing of the pole ends whereby to leave a complete annular groove 33 between the sagments and the outer side 34 of the inner pole. Preferably, the friction material, after being secured in place as above described, is cut away by means of a suitable tool of narrow width. This may be accomplished in a turning operation by feeding the tool in along the surface 34 until the friction material has been cut to its full depth as shown in Fig. 3.

To further insure expansion of the parts, a second annular groove 35 is cut in a similar manner in the friction material 26 intermediate the edges thereof. The material is thus divided into two annular rings which remain bonded to the filling material 32 and are backed by the shoulders 31, the outer portion lying against the inner face of the outer pole 24.

By mounting the friction material in the manner described above, the poles 24 may expand and contract radially with temperature changes without edgewise compression of the friction material 26 and therefore without danger of warping the gripping face. The latter thus remains flat under all temperature conditions and, as a result, the pole faces 25 are always disposed in a fixed relation with respect to the coacting face of the armature. The attractive force of the magnet thus remains constant for each degree of magnet energization irrespective of the temperature of the parts, and, as a consequence, the brake is capable of developing full retarding torque under all conditions encountered in service use.

I claim as my invention:

1. A magnet comprising a ring of magnetic material having U-shaped cross section and providing two concentric pole pieces having shoulders spaced from the end faces thereof, a ring of non-metallic friction material disposed between said pole pieces and supported by said shoulders with its friction face substantially flush with the pole faces, a winding disposed between said pole pieces, and a body filling the space around said winding and bonded to the back of said friction ring, the inner peripheral edge portion of said ring being cut away to form a narrow annular groove adjacent the inner pole piece and permitting freedom of thermal expansion of the inner pole piece.

2. A magnet comprising a ring of magnetic material providing two concentric pole pieces having shoulders spaced from the end faces thereof, a ring of friction material disposed between said pole pieces and supported by said shoulders with its friction face substantially flush with the pole faces, a winding disposed between said pole pieces and a body filling the space around said winding and bonded to the back of said friction ring, the inner peripheral edge portion of said ring being spaced from the inner pole piece to form a narrow annular groove permitting freedom of thermal expansion of the inner pole piece.

3. A magnet comprising a ring of magnetic material providing two concentric pole pieces, a ring of friction material disposed between said pole pieces with its friction face substantially flush with the pole faces, a winding disposed between said pole pieces, and a body filling the space around said winding and bonded to the back of said friction ring, the inner peripheral edge portion of said ring being spaced from the inner pole piece to form a narrow annular groove permitting freedom of thermal expansion of the inner pole piece.

4. A magnet comprising a ring of magnetic material providing two concentric poles, and a ring of friction material supported by said poles with its friction face substantially flush with the faces of said poles, said friction ring being spaced from the adjacent inner pole whereby to allow freedom of thermal expansion of the latter.

5. A magnet comprising a ring of magnetic material providing two concentric poles, and a ring of friction material supported by said poles with its friction face substantially flush with the faces of said poles, said friction ring being narrower than the space between said poles whereby to allow for thermal expansion of the inner pole.

6. A magnetic element comprising a ring of magnetic material providing two concentric pole pieces and a ring of friction material carried by said element between said pieces with its friction face substantially flush with the faces of said pieces, said friction ring being divided into a plurality of annular portions separated by a narrow annular groove with one portion separated from the adjacent pole piece by a second annular groove whereby said annular grooves allow for thermal expansion of said pole pieces.

7. A magnetic element comprising a ring of magnetic material providing two concentric pole pieces and a ring of friction material carried by said element between said pieces with its friction face substantially flush with the faces of said pieces, there being an annular groove formed in the friction face of said element to allow freedom of thermal expansion of said pole pieces.

JOHN GEORGE OETZEL.